United States Patent
Kim et al.

(10) Patent No.: US 9,408,096 B2
(45) Date of Patent: Aug. 2, 2016

(54) METHOD AND WIRELESS DEVICE FOR MONITORING CONTROL CHANNEL

(71) Applicant: LG ELECTRONICS INC., Seoul (KR)

(72) Inventors: Hak Seong Kim, Anyang-si (KR); Han Byul Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 87 days.

(21) Appl. No.: 14/355,417

(22) PCT Filed: Nov. 1, 2012

(86) PCT No.: PCT/KR2012/009138
§ 371 (c)(1),
(2) Date: Apr. 30, 2014

(87) PCT Pub. No.: WO2013/066083
PCT Pub. Date: May 10, 2013

(65) Prior Publication Data
US 2014/0307560 A1   Oct. 16, 2014

Related U.S. Application Data

(60) Provisional application No. 61/554,485, filed on Nov. 1, 2011, provisional application No. 61/619,927, filed on Apr. 3, 2012.

(51) Int. Cl.
*H04W 24/08*   (2009.01)
*H04L 5/00*    (2006.01)
*H04W 72/04*   (2009.01)
*H04L 1/00*    (2006.01)

(52) U.S. Cl.
CPC .............. *H04W 24/08* (2013.01); *H04L 1/0045* (2013.01); *H04L 1/0072* (2013.01); *H04L 5/001* (2013.01); *H04L 5/0053* (2013.01); *H04W 72/042* (2013.01); *H04L 1/0046* (2013.01); *H04L 5/005* (2013.01); *H04L 5/0051* (2013.01)

(58) Field of Classification Search
CPC ....................................................... H04L 5/001
See application file for complete search history.

(56) References Cited

U.S. PATENT DOCUMENTS

2011/0044391 A1   2/2011   Ji et al.

OTHER PUBLICATIONS

LG Electronics, "Consideration on transmit diversity scheme for enhanced PDCCH transmission", Agenda item: 7.5.5.2, R1-113194, 3GPP TSG RAN WG1 Meeting #66bis, Oct. 10-14, 2011, Section 1 lines 12-19.
LG Electronics, "Performance evaluation of multiplexing schemes for enhanced PDCCH transmission", Agenda item: 7.5.5.2, R1-113195, 3GPP TSG RAN WG1 Meeting #66bis, Oct. 10-14, 2011, Figures 1-2 and section 2.1.

(Continued)

*Primary Examiner* — Dang Ton
*Assistant Examiner* — Kevin Lee
(74) *Attorney, Agent, or Firm* — Birch, Stewart, Kolasch & Birch, LLP

(57) ABSTRACT

Provided are a method and a wireless device for monitoring a control channel in a wireless communication system. The wireless device monitors a first downlink control channel in a common search space of a subframe, and monitors a second downlink control channel in a user equipment-specific search space of the subframe. The first downlink control channel is modulated by a cell-specific reference signal, and the second downlink control channel is modulated by a reference signal that is specific to the wireless device.

8 Claims, 8 Drawing Sheets

(56) References Cited

OTHER PUBLICATIONS

Panasonic, "Clarification of RNTI reception on PDCCH", R1-084235, 3GPP RAN WG1 #55, Nov. 10-14, 2008, Tables 7.1-1-6.
3GPP, "3rd Generation Partnership Project; Technical Specification Group Radio Access Network; Evolved Universal Terrestrial Radio Access (E-UTRA); Physical Channels and Modulation (Release 10)," 3GPP TS 36.211 V10.2.0 Jun. 2011, pp. 1-103.
LG Electronics, "Consideration on transmission mode and DCI formats supported by EPDCCH," 3GPP TSG RAN WG1 Meeting #70, R1-123537, Qingdao, China, Aug. 13-17, 2012, pp. 1-2.
NEC Group, "E-PDCCH design aspects related to reference signals," 3GPP TSG RAN WG1 Meeting #68, R1-120254, Dresden, Germany, Feb. 6-10, 2012, 3 pages.
Research in Motion et al., "PDCCH Enhancement Considerations," 3GPP TSG RAN WG1 Meeting #65, R1-111661, Barcelona, Spain, May 9-13, 2011, pp. 1-4.

METHOD AND WIRELESS DEVICE FOR MONITORING CONTROL CHANNEL

CROSS REFERENCE TO RELATED APPLICATIONS

This application is the National Phase of PCT/KR2012/009138 filed on Nov. 1, 2012, which claims priority under 35 U.S.C. 119(e) to U.S. Provisional Application Nos. 61/554,485 filed on Nov. 1, 2011 and 61/619,927 filed on Apr. 3, 2012, all of which are hereby expressly incorporated by reference into the present application.

BACKGROUND OF THE INVENTION

1. Field of the Invention

The present invention relates to wireless communications, and more particularly, to a method for monitoring a downlink control channel in a wireless communication system, and a wireless device using the method.

2. Related Art

Long term evolution (LTE) based on 3rd generation partnership project (3GPP) technical specification (TS) release 8 is a promising next-generation mobile communication standard. Recently, LTE-advanced (LTE-A) based on 3GPP TS release 10 supporting multiple carriers is under standardization.

As disclosed in 3GPP TS 36.211 V10.2.0 (2011-06) "Evolved Universal Terrestrial Radio Access (E-UTRA); Physical Channels and Modulation (Release 10)", a physical channel of 3GPP LTE/LTE-A can be classified into a downlink channel, i.e., a physical downlink shared channel (PDSCH) and a physical downlink control channel (PDCCH), and an uplink channel, i.e., a physical uplink shared channel (PUSCH) and a physical uplink control channel (PUCCH).

To cope with increasing data traffic, various techniques are introduced to increase transmission capacity of a mobile communication system. For example, a multiple input multiple output (MIMO) technique using multiple antennas, a carrier aggregation technique supporting multiple cells, etc., are introduced.

A control channel designed in 3GPP LTE/LTE-A carries a variety of control information. The introduction of the new technique requires to increase capacity of the control channel and to improve scheduling flexibility.

SUMMARY OF THE INVENTION

The present invention provides a method of monitoring a downlink control channel, and a wireless device using the method.

In an aspect, a method of monitoring a control channel in a wireless communication system is provided. The method includes monitoring, by a wireless device, a first downlink control channel in a common search space, and monitoring, by the wireless device, a second downlink control channel in a user equipment (UE)-specific search space. The first downlink control channel is demodulated by a cell-specific reference signal, and the second downlink control channel is demodulated by a reference signal specific to the wireless device.

The second downlink control channel in the UE-specific search space may be decoded based on an identifier of the wireless device, and the first downlink control channel in the common search space may be decoded based on an identifier shared by one or more wireless devices.

The subframe may include a plurality of orthogonal frequency division multiplexing (OFDM) symbols.

The common search space may be disposed at first 3 OFDM symbols of the plurality of OFDM symbols, and the UE-specific search space may be disposed at one or more OFDM symbols among the plurality of OFDM symbols except the first 3 OFDM symbols.

The method may further include receiving, by the wireless device, from a base station, information about subframe in which the first and second downlink control channels are monitored.

In another aspect, a wireless device for monitoring a control channel in a wireless communication system is provided. The wireless device includes a radio frequency (RF) unit configured to transmit and receive a radio signal, and a processor operatively coupled to the RF unit and configured to monitor a first downlink control channel in a common search space, and monitor a second downlink control channel in a user equipment (UE)-specific search space.

A wireless device can monitor various downlink control channels in different search spaces according to types of downlink control information.

DESCRIPTION OF EXEMPLARY EMBODIMENTS

A wireless device may be fixed or mobile, and may be referred to as another terminology, such as a user equipment (UE), a mobile station (MS), a mobile terminal (MT), a user terminal (UT), a subscriber station (SS), a personal digital assistant (PDA), a wireless modem, a handheld device, etc. The wireless device may also be a device supporting only data communication such as a machine-type communication (MTC) device.

A base station (BS) is generally a fixed station that communicates with the wireless device, and may be referred to as another terminology, such as an evolved-NodeB (eNB), a base transceiver system (BTS), an access point, etc.

Hereinafter, it is described that the present invention is applied according to a 3rd generation partnership project (3GPP) long term evolution (LTE) based on 3GPP technical specification (TS) release 8 or 3GPP LTE-advanced (LTE-A) based on 3GPP TS release 10. However, this is for exemplary purposes only, and thus the present invention is also applicable to various wireless communication networks. In the following description, LTE and/or LTE-A are collectively referred to as LTE.

The wireless device may be served by a plurality of serving cells. Each serving cell may be defined with a downlink (DL) component carrier (CC) or a pair of a DL CC and an uplink (UL) CC.

The serving cell may be classified into a primary cell and a secondary cell. The primary cell operates at a primary frequency, and is a cell designated as the primary cell when an initial network entry process is performed or when a network re-entry process starts or in a handover process. The primary cell is also called a reference cell. The secondary cell operates at a secondary frequency. The secondary cell may be configured after an RRC connection is established, and may be used to provide an additional radio resource. At least one primary cell is configured always. The secondary cell may be added/modified/released by using higher-layer signaling (e.g., a radio resource control (RRC) message).

A cell index (CI) of the primary cell may be fixed. For example, a lowest CI may be designated as the CI of the primary cell. It is assumed hereinafter that the CI of the primary cell is 0 and a CI of the secondary cell is allocated sequentially starting from 1.

Figure 1:
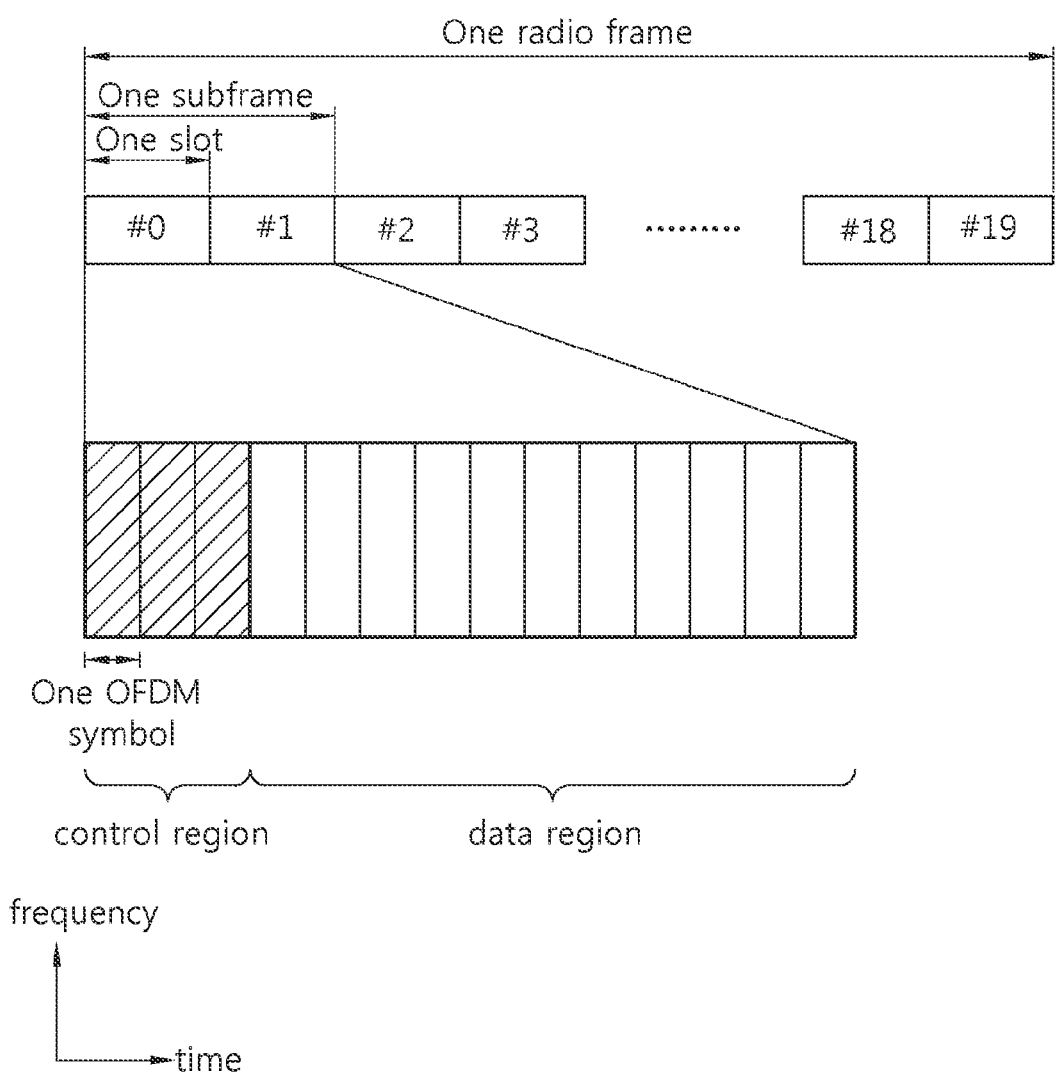
FIG. 1 shows a structure of a downlink (DL) radio frame in 3rd generation partnership project (3GPP) long term evolution-advanced (LTE-A).

FIG. 1 shows a structure of a DL radio frame in 3GPP LTE-A. The section 6 of 3GPP TS 36.211 V10.2.0 (2011-06) "Evolved Universal Terrestrial Radio Access (E-UTRA); Physical Channels and Modulation (Release 10)" may be incorporated herein by reference.

A radio frame includes 10 subframes indexed with 0 to 9. One subframe includes 2 consecutive slots. A time required for transmitting one subframe is defined as a transmission time interval (TTI). For example, one subframe may have a length of 1 millisecond (ms), and one slot may have a length of 0.5 ms.

One slot may include a plurality of orthogonal frequency division multiplexing (OFDM) symbols in a time domain. Since the 3GPP LTE uses orthogonal frequency division multiple access (OFDMA) in a downlink (DL), the OFDM symbol is only for expressing one symbol period in the time domain, and there is no limitation in multiple access schemes or terminologies. For example, the OFDM symbol may also be referred to as another terminology such as a single carrier frequency division multiple access (SC-FDMA) symbol, a symbol period, etc.

Although it is described that one slot includes 7 OFDM symbols for example, the number of OFDM symbols included in one slot may vary depending on a length of a cyclic prefix (CP). According to 3GPP TS 36.211 V10.2.0, in case of a normal CP, one slot includes 7 OFDM symbols, and in case of an extended CP, one slot includes 6 OFDM symbols.

A resource block (RB) is a resource allocation unit, and includes a plurality of subcarriers in one slot. For example, if one slot includes 7 OFDM symbols in a time domain and the RB includes 12 subcarriers in a frequency domain, one RB can include 7☐12 resource elements (REs).

A DL subframe is divided into a control region and a data region in the time domain. The control region includes up to first four OFDM symbols of a first slot in the subframe. However, the number of OFDM symbols included in the control region may vary. A physical downlink control channel (PDCCH) and other control channels are allocated to the control region, and a physical downlink shared channel (PDSCH) is allocated to the data region.

As disclosed in 3GPP TS 36.211 V10.2.0, examples of a physical control channel in 3GPP LTE/LTE-A include a physical downlink control channel (PDCCH), a physical control format indicator channel (PCFICH), and a physical hybrid-ARQ indicator channel (PHICH).

The PCFICH transmitted in a first OFDM symbol of the subframe carries a control format indicator (CFI) regarding the number of OFDM symbols (i.e., a size of the control region) used for transmission of control channels in the subframe. A wireless device first receives the CFI on the PCFICH, and thereafter monitors the PDCCH.

Unlike the PDCCH, the PCFICH does not use blind decoding, and is transmitted by using a fixed PCFICH resource of the subframe.

The PHICH carries a positive-acknowledgement (ACK)/negative-acknowledgement (NACK) signal for an uplink hybrid automatic repeat request (HARQ). The ACK/NACK signal for uplink (UL) data on a PUSCH transmitted by the wireless device is transmitted on the PHICH.

A physical broadcast channel (PBCH) is transmitted in first four OFDM symbols in a second slot of a first subframe of a radio frame. The PBCH carries system information necessary for communication between the wireless device and a BS. The system information transmitted through the PBCH is referred to as a master information block (MIB). In comparison thereto, system information transmitted on the PDCCH is referred to as a system information block (SIB).

Control information transmitted through the PDCCH is referred to as downlink control information (DCI). The DCI may include resource allocation of the PDSCH (this is referred to as a downlink (DL) grant), resource allocation of a PUSCH (this is referred to as an uplink (UL) grant), a set of transmit power control commands for individual UEs in any UE group, and/or activation of a voice over Internet protocol (VoIP).

In 3GPP LTE/LTE-A, transmission of a DL transport block is performed in a pair of the PDCCH and the PDSCH. Transmission of a UL transport block is performed in a pair of the PDCCH and the PUSCH. For example, the wireless device receives the DL transport block on a PDSCH indicated by the PDCCH. The wireless device receives a DL resource assignment on the PDCCH by monitoring the PDCCH in a DL subframe. The wireless device receives the DL transport block on a PDSCH indicated by the DL resource assignment.

Figure 2:
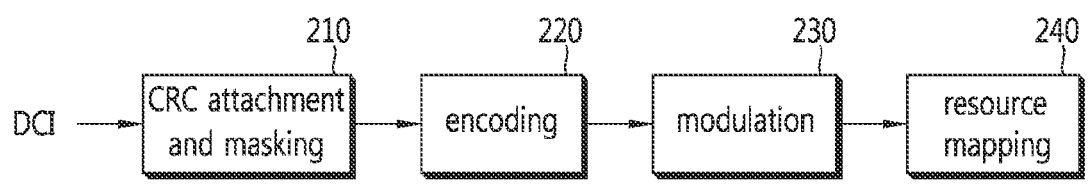
FIG. 2 is a block diagram showing a structure of a physical downlink control channel (PDCCH).

FIG. 2 is a block diagram showing a structure of a PDCCH.

The 3GPP LTE/LTE-A uses blind decoding for PDCCH detection. The blind decoding is a scheme in which a desired identifier is de-masked from a cyclic redundancy check (CRC) of a received PDCCH (referred to as a candidate PDCCH) to determine whether the PDCCH is its own control channel by performing CRC error checking.

A BS determines a PDCCH format according to DCI to be transmitted to a wireless device, attaches a CRC to control information, and masks a unique identifier (referred to as a radio network temporary identifier (RNTI)) to the CRC according to an owner or usage of the PDCCH (block 210).

If the PDCCH is for a specific wireless device, a unique identifier (e.g., cell-RNTI (C-RNTI)) of the wireless device may be masked to the CRC. Alternatively, if the PDCCH is for a paging message, a paging indication identifier (e.g., paging-RNTI (P-RNTI)) may be masked to the CRC. If the PDCCH is for system information, a system information identifier (e.g., system information-RNTI (SI-RNTI)) may be masked to the CRC. To indicate a random access response that is a response for transmission of a random access preamble of the wireless device, a random access-RNTI (RA-RNTI) may be masked to the CRC. To indicate a transmit power control (TPC) command for a plurality of wireless devices, a TPC-RNTI may be masked to the CRC.

When the C-RNTI is used, the PDCCH carries control information for a specific wireless device (such information is called UE-specific control information), and when other RNTIs are used, the PDCCH carries common control information received by all or a plurality of wireless devices in a cell.

The CRC-attached DCI is encoded to generate coded data (block 220). Encoding includes channel encoding and rate matching.

The coded data is modulated to generate modulation symbols (block 230).

The modulation symbols are mapped to physical resource elements (REs) (block 240). The modulation symbols are respectively mapped to the REs.

A control region in a subframe includes a plurality of control channel elements (CCEs). The CCE is a logical allocation unit used to provide the PDCCH with a coding rate depending on a radio channel state, and corresponds to a plurality of resource element groups (REGs). The REG includes a plurality of REs. According to an association relation of the number of CCEs and the coding rate provided by the CCEs, a PDCCH format and a possible number of bits of the PDCCH are determined.

One REG includes 4 REs. One CCE includes 9 REGs. The number of CCEs used to configure one PDCCH may be selected from a set {1, 2, 4, 8}. Each element of the set {1, 2, 4, 8} is referred to as a CCE aggregation level.

The BS determines the number of CCEs used in transmission of the PDCCH according to a channel state. For example, a wireless device having a good DL channel state can use one CCE in PDCCH transmission. A wireless device having a poor DL channel state can use 8 CCEs in PDCCH transmission.

A control channel consisting of one or more CCEs performs interleaving on an REG basis, and is mapped to a physical resource after performing cyclic shift based on a cell identifier (ID).

Figure 3:
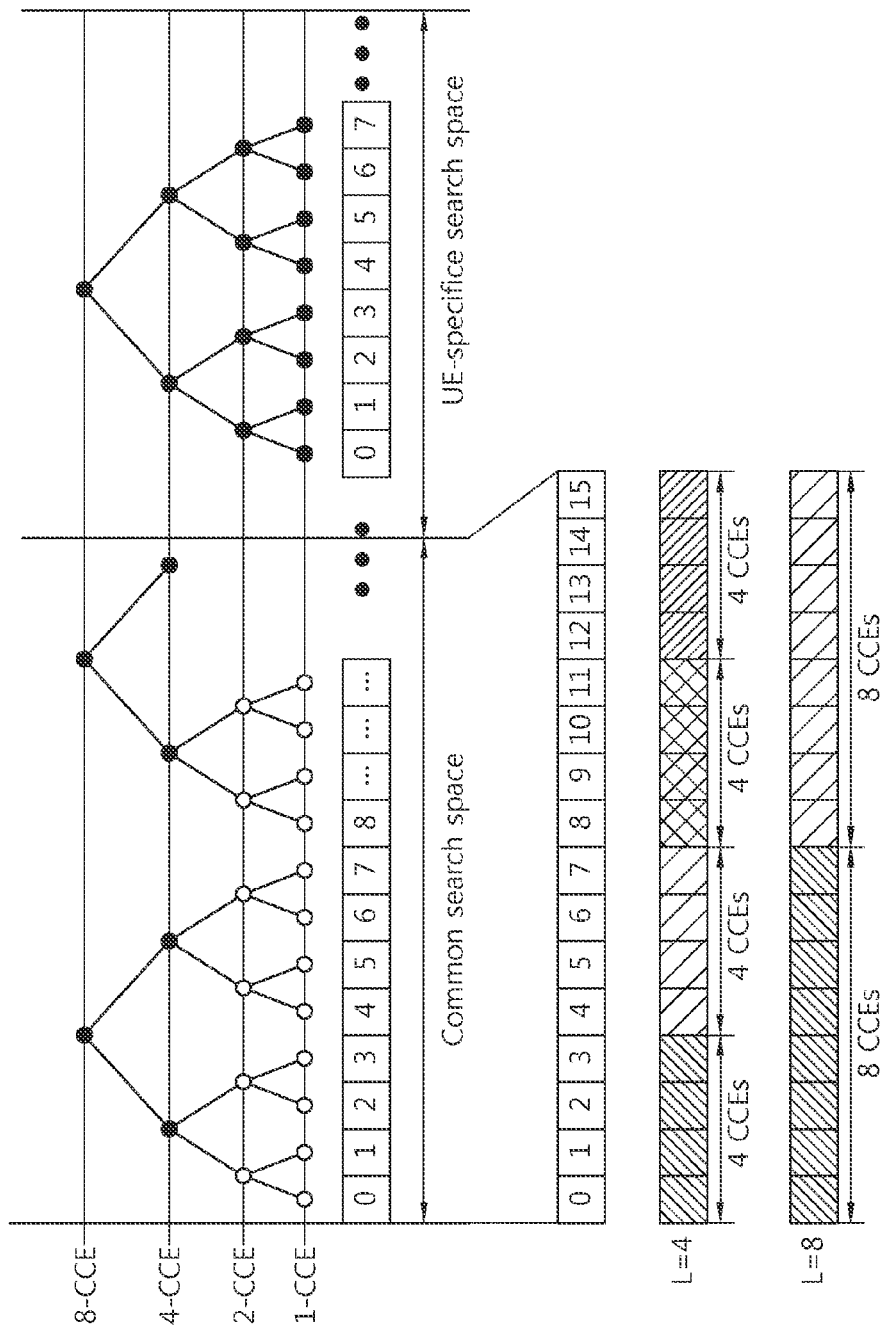
FIG. 3 shows an example of monitoring a PDCCH.

FIG. 3 shows an example of monitoring a PDCCH. The section 9 of 3GPP TS 36.213 V10.2.0 (2011-06) can be incorporated herein by reference.

The 3GPP LTE uses blind decoding for PDCCH detection. The blind decoding is a scheme in which a desired identifier is de-masked from a CRC of a received PDCCH (referred to as a candidate PDCCH) to determine whether the PDCCH is its own control channel by performing CRC error checking. A wireless device cannot know about a specific position in a control region in which its PDCCH is transmitted and about a specific CCE aggregation or DCI format used for PDCCH transmission.

A plurality of PDCCHs can be transmitted in one subframe. The wireless device monitors the plurality of PDCCHs in every subframe. Monitoring is an operation of attempting PDCCH decoding by the wireless device according to a format of the monitored PDCCH.

The 3GPP LTE uses a search space to reduce a load of blind decoding. The search space can also be called a monitoring set of a CCE for the PDCCH. The wireless device monitors the PDCCH in the search space.

The search space is classified into a common search space and a UE-specific search space. The common search space is a space for searching for a PDCCH having common control information and consists of 16 CCEs indexed with 0 to 15. The common search space supports a PDCCH having a CCE aggregation level of {4, 8}. However, a PDCCH (e.g., DCI formats 0, 1A) for carrying UE-specific information can also be transmitted in the common search space. The UE-specific search space supports a PDCCH having a CCE aggregation level of {1, 2, 4, 8}.

Table 1 shows the number of PDCCH candidates monitored by the wireless device.

TABLE 1

| Search Space Type | Aggregation level L | Size [In CCEs] | Number of PDCCH candidates | DCI formats |
|---|---|---|---|---|
| UE-specific | 1 | 6 | 6 | 0, 1, 1A, 1B, 1D, 2, 2A |
| | 2 | 12 | 6 | |
| | 4 | 8 | 2 | |
| | 8 | 16 | 2 | |
| Common | 4 | 16 | 4 | 0, 1A, 1C, 3/3A |
| | 8 | 16 | 2 | |

A size of the search space is determined by Table 1 above, and a start point of the search space is defined differently in the common search space and the UE-specific search space. Although a start point of the common search space is fixed irrespective of a subframe, a start point of the UE-specific search space may vary in every subframe according to a UE identifier (e.g., C-RNTI), a CCE aggregation level, and/or a slot number in a radio frame. If the start point of the UE-specific search space exists in the common search space, the UE-specific search space and the common search space may overlap with each other.

In a CCE aggregation level L∈{1,2,3,4}, a search space $S^{(L)}_k$ is defined as a set of PDCCH candidates. A CCE corresponding to a PDCCH candidate m of the search space $S^{(L)}_k$ is given by Equation 1 below.

$$L \cdot \{(Y_k + m') \bmod \lfloor N_{CCE,k}/L \rfloor\} + i$$ [Equation 1]

Herein, i=0,1, . . . ,L−1, m=0, . . . ,$M^{(L)}$−1, and $N_{CCE,k}$ denotes the total number of CCEs that can be used for PDCCH transmission in a control region of a subframe k. The control region includes a set of CCEs numbered from 0 to $N_{CCE,k-1}$. $M^{(L)}$ denotes the number of PDCCH candidates in a CCE aggregation level L of a given search space.

If a carrier indicator field (CIF) is set to the wireless device, m'=m+$M^{(L)}$$n_{cif}$. Herein, $n_{cif}$ is a value of the CIF. If the CIF is not set to the wireless device, m'=m.

In a common search space, $Y_k$ is set to 0 with respect to two aggregation levels L=4 and L=8.

In a UE-specific search space of the aggregation level L, a variable $Y_k$ is defined by Equation 2 below.

$$Y_k = (A \cdot Y_{k-1}) \bmod D$$ [Equation 2]

Herein, $Y_{-1}$=$n_{RNTI}$≠0, A=39827, D=65537, k=floor($n_s$/2), and $n_s$ denotes a slot number in a radio frame.

When the wireless device monitors the PDCCH by using the C-RNTI, a search space and a DCI format used in monitoring are determined according to a transmission mode of the PDSCH. Table 2 below shows an example of PDCCH monitoring in which the C-RNTI is set.

TABLE 2

| Transmission mode | DCI format | search space | Transmission mode of PDSCH based on PDCCH |
|---|---|---|---|
| Mode 1 | DCI format 1A | common and UE specific | Single antenna port, port 0 |
| | DCI format 1 | UE specific | Single antenna port, port 0 |
| Mode 2 | DCI format 1A | common and UE specific | Transmit diversity |
| | DCI format 1 | UE specific | Transmit diversity |
| Mode 3 | DCI format 1A | common and UE specific | Transmit diversity |
| | DCI format 2A | UE specific | CDD(Cyclic Delay Diversity) or Transmit diversity |

TABLE 2-continued

| Transmission mode | DCI format | search space | Transmission mode of PDSCH based on PDCCH |
|---|---|---|---|
| Mode 4 | DCI format 1A | common and UE specific | Transmit diversity |
|  | DCI format 2 | UE specific | Closed-loop spatial multiplexing |
| Mode 5 | DCI format 1A | common and UE specific | Transmit diversity |
|  | DCI format 1D | UE specific | MU-MIMO(Multi-user Multiple Input Multiple Output) |
| Mode 6 | DCI format 1A | common and UE specific | Transmit diversity |
|  | DCI format 1B | UE specific | Closed-loop spatial multiplexing |
| Mode 7 | DCI format 1A | common and UE specific | If the number of PBCH transmission ports is 1, single antenna port, port 0, otherwise Transmit diversity |
|  | DCI format 1 | UE specific | Single antenna port, port 5 |
| Mode 8 | DCI format 1A | common and UE specific | If the number of PBCH transmission ports is 1, single antenna port, port 0, otherwise, Transmit diversity |
|  | DCI format 2B | UE specific | Dual layer transmission (port 7 or 8), or single antenna port, port 7 or 8 |

The usage of the DCI format is classified as shown in Table 3 below.

TABLE 3

| DCI format | Contents |
|---|---|
| DCI format 0 | It is used for PUSCH scheduling. |
| DCI format 1 | It is used for scheduling of one PDSCH codeword. |
| DCI format 1A | It is used for compact scheduling and random access process of one PDSCH codeword. |
| DCI format 1B | It is used in simple scheduling of one PDSCH codeword having precoding information. |
| DCI format 1C | It is used for very compact scheduling of one PDSCH codeword. |
| DCI format 1D | It is used for simple scheduling of one PDSCH codeword having precoding and power offset information. |
| DCI format 2 | It is used for PDSCH scheduling of UEs configured to a closed-loop spatial multiplexing mode. |
| DCI format 2A | It is used for PDSCH scheduling of UEs configured to an open-loop spatial multiplexing mode. |
| DCI format 3 | It is used for transmission of a TPC command of a PUCCH and a PUSCH having a 2-bit power adjustment. |
| DCI format 3A | It is used for transmission of a TPC command of a PUCCH and a PUSCH having a 1-bit power adjustment. |

Figure 4:
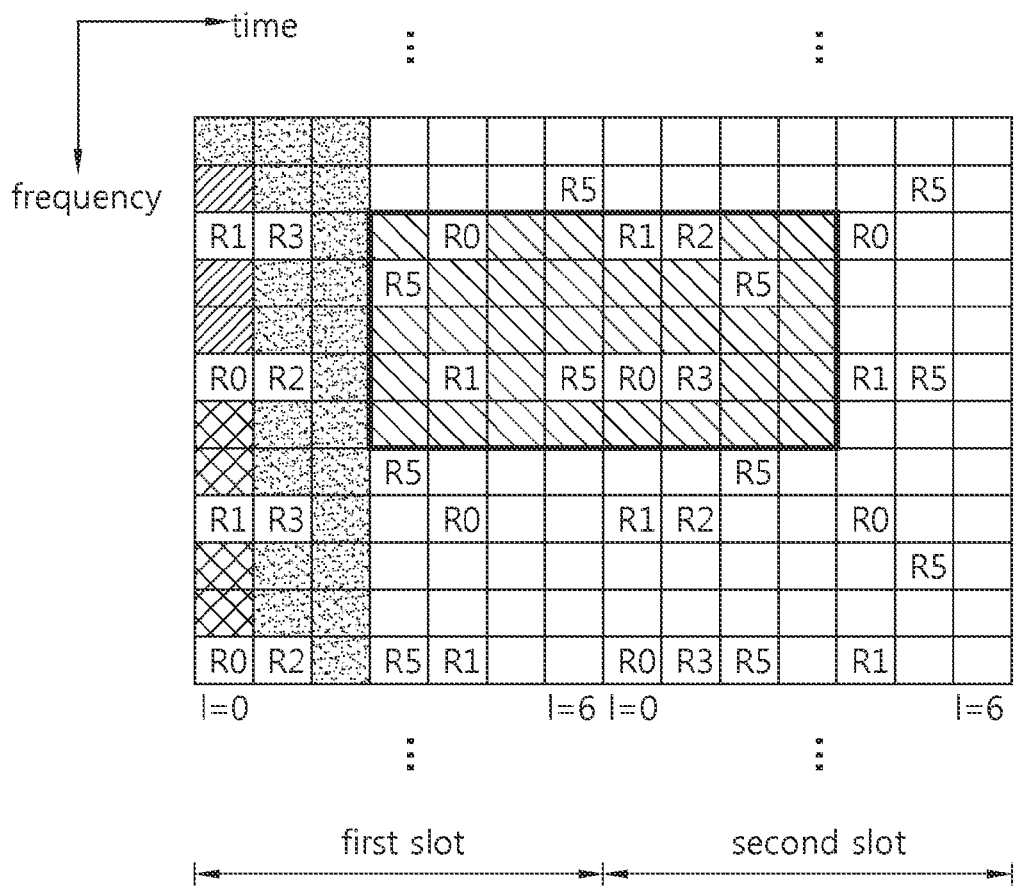
FIG. 4 shows an example of arranging a reference signal and a control channel in a DL subframe of 3GPP LTE.

FIG. 4 shows an example of arranging a reference signal and a control channel in a DL subframe of 3GPP LTE.

A control region (or a PDCCH region) includes first three OFDM symbols, and a data region in which a PDSCH is transmitted includes the remaining OFDM symbols.

A PCFICH, a PHICH, and/or a PDCCH are transmitted in the control region. A control format indictor (CFI) of the PCFICH indicates three OFDM symbols. A region excluding a resource in which the PCFICH and/or the PHICH are transmitted in the control region is a PDCCH region which monitors the PDCCH.

Various reference signals are transmitted in the subframe.

A cell-specific reference signal (CRS) may be received by all wireless devices in a cell, and is transmitted across a full downlink frequency band. In FIG. 4, 'R0' indicates a resource element (RE) used to transmit a CRS for a first antenna port, 'R1' indicates an RE used to transmit a CRS for a second antenna port, 'R2' indicates an RE used to transmit a CRS for a third antenna port, and 'R3' indicates an RE used to transmit a CRS for a fourth antenna port.

An RS sequence $r_{1,ns}(m)$ for a CRS is defined as follows.

$$r_{l,ns}(m) = \frac{1}{\sqrt{2}}(1 - 2 \cdot c(2m)) + j\frac{1}{\sqrt{2}}(1 - 2 \cdot c(2m+1)) \quad \text{[Equation 3]}$$

Herein, $m=0, 1, \ldots, 2N_{maxRB}-1$. $N_{maxRB}$ is the maximum number of RBs. ns is a slot number in a radio frame. l is an OFDM symbol index in a slot.

A pseudo-random sequence c(i) is defined by a length-31 gold sequence as follows.

$$c(n)=(x_1(n+Nc)+x_2(n+Nc)) \mod 2$$

$$x_1(n+31)=(x_1(n+3)+x_1(n)) \mod 2$$

$$x_2(n+31)=(x_2(n+3)+x_2(n+2)+x_2(n+1)+x_2(n)) \mod 2 \quad \text{[Equation 4]}$$

Herein, Nc=1600, and a first m-sequence is initialized as $x_1(0)=1, x_1(n)=0, m=1,2,\ldots,30$.

A second m-sequence is initialized as $c_{init}=2^{10}(7(ns+1)+1+1)(2N^{cell}_{ID}+1)+2 \, N^{cell}_{ID}+N_{CP}$ at a start of each OFDM symbol. $N^{cell}_{ID}$ is a physical cell identifier (PCI). $N_{CP}=1$ in a normal CP case, and $N_{CP}=0$ in an extended CP case.

A UE-specific reference signal (URS) is transmitted in the subframe. Whereas the CRS is transmitted in the entire region of the subframe, the URS is transmitted in a data region of the subframe and is used to demodulate the PDSCH. In FIG. 4, 'R5' indicates an RE used to transmit the URS. The URS is also called a dedicated reference signal (DRS) or a demodulation reference signal (DM-RS).

The URS is transmitted only in an RB to which a corresponding PDSCH is mapped. Although R5 is indicated in FIG. 4 in addition to a region in which the PDSCH is transmitted, this is for indicating a location of an RE to which the URS is mapped.

The URS is used only by a wireless device which receives a corresponding PDSCH. A reference signal (RS) sequence $r_{ns}(m)$ for the URS is equivalent to Equation 3. In this case, $m=0, 1, \ldots, 12N_{PDSCH,RB}-1$, and $N_{PDSCH,RB}$ is the number of RBs used for transmission of a corresponding PDSCH. A pseudo-random sequence generator is initialized as $c_{init}=(floor(ns/2)+1)(2 \, N^{cell}_{ID}+1)2^{16}+n_{RNTI}$ at a start of each subframe. $n_{RNTI}$ is an identifier of the wireless device.

The aforementioned initialization method is for a case where the URS is transmitted through the single antenna, and when the URS is transmitted through multiple antennas, the pseudo-random sequence generator is initialized as $c_{init}=(floor(ns/2)+1)(2 \, Ncell_{ID}+1)2^{16}+n_{SCID}$ at a start of each subframe. $n_{SCID}$ is a parameter acquired from a DL grant (e.g., a DCI format 2B or 2C) related to PDSCH transmission.

The URS supports multiple input multiple output (MIMO) transmission. According to an antenna port or a layer, an RS sequence for the URS may be spread into a spread sequence as follows.

TABLE 4

| Layer | [w(0) w(1) w(2) w(3)] |
|---|---|
| 1 | [+1 +1 +1 +1] |
| 2 | [+1 −1 +1 −1] |
| 3 | [+1 +1 +1 +1] |
| 4 | [+1 −1 +1 −1] |
| 5 | [+1 +1 −1 −1] |
| 6 | [−1 −1 +1 +1] |

TABLE 4-continued

| Layer | [w(0) w(1) w(2) w(3)] |
|---|---|
| 7 | [+1 −1 −1 +1] |
| 8 | [−1 +1 +1 −1] |

A layer may be defined as an information path which is input to a precoder. A rank is a non-zero eigenvalue of a MIMO channel matrix, and is equal to the number of layers or the number of spatial streams. The layer may correspond to an antenna port for identifying a URS and/or a spread sequence applied to the URS.

Meanwhile, the PDCCH is monitored in an area restricted to the control region in the subframe, and a CRS transmitted in a full band is used to demodulate the PDCCH. As a type of control data is diversified and an amount of control data is increased, scheduling flexibility is decreased when using only the existing PDCCH. In addition, in order to decrease an overhead caused by CRS transmission, an enhanced PDCCH (EPDCCH) is introduced.

Figure 5:
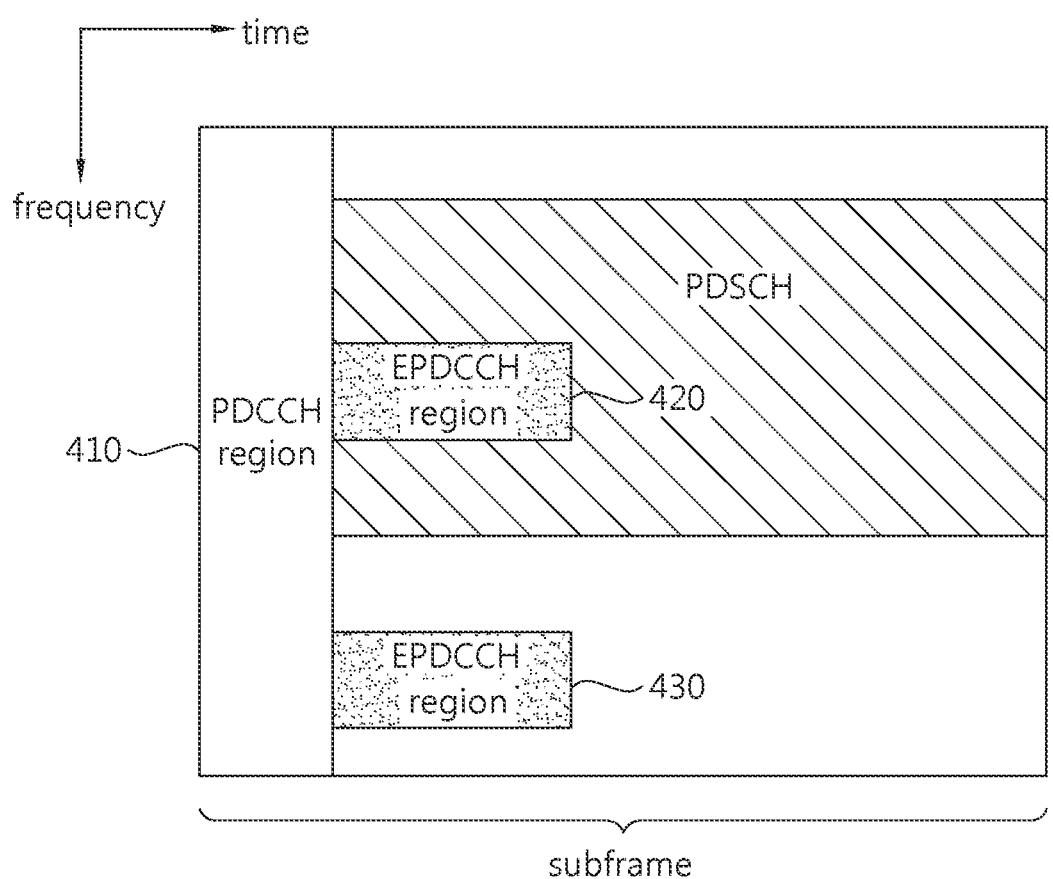
FIG. 5 is an example of a subframe having an enhanced PDCCH (EPDCCH).

FIG. 5 is an example of a subframe having an EPDCCH. The subframe may include zero or one PDCCH region 410 and zero or more EPDCCH regions 420 and 430.

The EPDCCH regions 420 and 430 are regions in which a wireless device monitors the EPDCCH. The PDCCH region 410 is located in up to first four OFDM symbols of the subframe, whereas the EPDCCH regions 420 and 430 may be flexibly scheduled in an OFDM symbol located after the PDCCH region 410.

One or more EPDCCH regions 420 and 430 may be assigned to the wireless device. The wireless device may monitor EPDDCH data in the assigned EPDCCH regions 420 and 430.

The number/location/size of the EPDCCH regions 420 and 430 and/or information regarding a subframe for monitoring the EPDCCH may be reported by a BS to the wireless device by using a radio resource control (RRC) message or the like.

In the PDCCH region 410, a PDCCH may be demodulated on the basis of a CRS. In the EPDCCH regions 420 and 430, instead of the CRS, a DM-RS may be defined for demodulation of the EPDCCH. An associated DM-RS may be transmitted in the EPDCCH regions 420 and 430.

An RS sequence for the associated DM-RS is equivalent to Equation 3. In this case, m=0, 1, . . . , $12N_{RB}-1$, and $N_{RB}$ is a maximum number of RBs. A pseudo-random sequence generator may be initialized as $c_{init}=(\text{floor}(ns/2)+1)(2N_{EPDCCH,ID}+1)2^{16}+n_{EPDCCH,SCID}$ at a start of each subframe. ns is a slot number of a radio frame. $N_{EPDCCH,ID}$ is a cell index related to a corresponding EPDCCH region. $n_{EPDCCH,SCID}$ is a parameter given from higher layer signaling.

Each of the EPDCCH regions 420 and 430 may be used to schedule a different cell. For example, an EPDCCH in the EPDCCH region 420 may carry scheduling information for a primary cell, and an EPDCCH in the EPDCCH region 430 may carry scheduling information for a secondary cell.

When the EPDCCH is transmitted through multiple antennas in the EPDCCH regions 420 and 430, the same precoding as that used in the EPDCCH may be applied to a DM-RS in the EPDCCH regions 420 and 430.

Comparing with a case where the PDCCH uses a CCE as a transmission resource unit, a transmission resource unit for the EPDCCH is called an enhanced control channel element (ECCE). An aggregation level may be defined as a resource unit for monitoring the EPDCCH. For example, when 1 ECCE is a minimum resource for the EPDCCH, it may be defined as an aggregation level L={1, 2, 4, 8, 16}.

Hereinafter, an EPDDCH search space may correspond to an EPDCCH region. In the EPDCCH search space, one or more EPDCCH candidates may be monitored for each one or more aggregation levels.

In the EPDCCH, instead of transmitting control information in the existing limited PDCCH region, DCI can be transmitted by the BS in the PDSCH region, thereby enabling flexibly scheduling. In addition, the EPDCCH can contribute to decrease an inter-cell interference in a wireless network having a macro cell and a pico cell.

The EPDCCH region may be pre-designated by using an RRC message or the like, and the wireless device may perform blind decoding only for the EPDCCH region. However, a situation where the EPDCCH cannot be normally monitored may occur due to an unexpected interference, an EPDCCH reconfiguration, an RRC reconfiguration, etc. In this case, monitoring of the PDCCH instead of the EPDCCH may allow a more robust system operation. That is, although the wireless device monitors the EPDCCH in a normal mode, the wireless device may transition to a fallback mode for monitoring the PDCCH instead of the EPDCCH in a specific situation.

In order to transition to the fallback mode, it is necessary to designate a subframe capable of monitoring the PDCCH. This is to allow the wireless device to operate in the fallback mode in the designated subframe. For example, the wireless device may acquire DCI through a PDCCH of a subframe in the fallback mode, even if decoding of the EPDCCH fails due to the inter-cell interference. The DCI on the PDCCH of the fallback mode may include the same content as DCI on the EPDCCH, or may include a new content.

If the situation where a specific condition is satisfied and thus the EPDCCH cannot be received is continued more than a specific time duration, the wireless device may monitor only the PDCCH thereafter. For example, the specific configuration may include at least any one of cases where: 1) EPDCCH reception quality is decreased to be less than or equal to a threshold; 2) an EPDCCH decoding failure occurs N or more times during a designated time duration; 3) N subframes elapse after the EPDCCH decoding failure starts; or 4) a timer starts at the occurrence of the EPDCCH decoding failure, and the timer expires.

Figure 6:
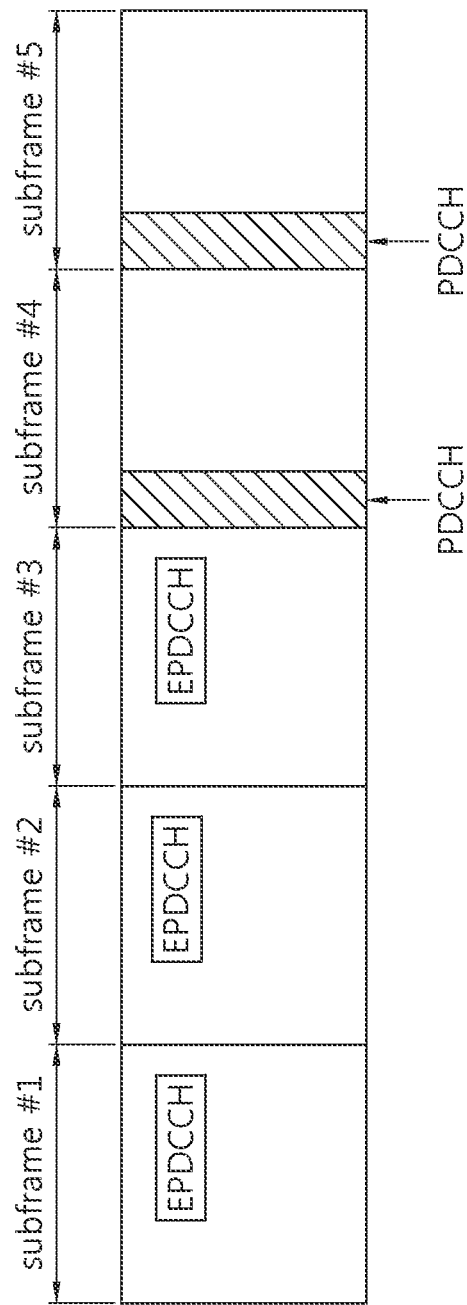
FIG. 6 shows a subframe configuration according to an embodiment of the present invention.

FIG. 6 shows a subframe configuration according to an embodiment of the present invention.

In subframes #1, #2, and #3, a wireless device monitors an EPDCCH. In subframes #4 and #5, the wireless device monitors a PDCCH. The subframes #1, #2, and #3 are subframes for monitoring the EPDCCH, and may also be called normal subframes, EPDCCH subframes, or first-type subframes. The EPDCCH subframe may also monitor a PDCCH in addition to the EPDCCH. The subframes #4 and #5 are subframes for monitoring the PDCCH, not the EPDCCH, and may also be called PDCCH subframes or second-type subframes. The number and locations of subframes are for exemplary purposes only.

The PDCCH subframe may be designated in unit of a radio frame, or may be designated in unit of an integer multiple of the radio frame. For example, it may be designed with a specific pattern or bitmap form in unit of the radio frame. A bitmap {0001100011} for subframes #1 to #10 may indicate that subframes #4, #5, #9, and #10 are PDCCH subframes. Alternatively, a subframe in which a specific signal (e.g., PBCH, synchronization signal) is transmitted may be designated as the PDCCH subframe.

The PDCCH subframe and the EPDCCH subframe may be properly combined and operated according to a feature of control information. For example, information for changing and updating importance information such as system information and cell selection/reselection information or broadcast information or information masked with SI-RNTI, P-RNTI, and RA-RNTI may be monitored in a PDCCH region, and scheduling information (i.e., DL grant and UL grant) may be monitored in the EPDCCH. Information transmitted on the PDCCH is not transmitted on the EPDCCH. Alternatively, in the EPDCCH region, a common search space (CSS) may not exist in the EPDCCH region, and only a UE-specific search space (USS) may exist.

In the EPDCCH region, both the CSS and the USS may exist. However, in a designated subframe (e.g., 1st and 6th subframes of a radio frame), important information such as system information may be monitored in the CSS of the PDCCH region instead of the CSS of the EPDCCH region.

Now, various methods of implementing the CSS and the USS in the PDCCH region and the EPDCCH region are proposed.

In one embodiment, blind decoding can be designed to maintain the same complexity/capability/trial between subframes.

If it is assumed that the number of blind decoding trials does not change in each subframe, a wireless device may try a variety of blind decoding in the PDCCH subframe and the EPDCCH subframe within a range not exceeding the capability. For example, it is assumed that the blind decoding capability of the wireless device is up to 44 trials. If there is one DCI format to be monitored in the EPDCCH subframe, the whole blind decoding capability may be used for the DCI format. If there are two DCI formats, the blind decoding may be tried by being divided for each DCI format. 22 decoding trials may be achieved for each DCI format. A large-sized DCI format such as a DCI format 1A and a DCI format 0 may be regarded as one DCI format.

Assume that, in the PDCCH subframe, only a CSS exists and only the DCI format 1A/1C is monitored, whereas in the EPDCCH, only a USS exists. Blind decoding complexity in the CSS may be configured, in practice, to be the same as blind decoding complexity in the USS.

In a second embodiment, blind decoding complexity may be distributed between search spaces or between DCI formats or between candidate positions in the same subframe.

When the total number of blind decoding trials that can be performed by the wireless device in one subframe is fixed, the number of candidate EPDCCHs and/or an aggregation level of the EPDCCH may change.

Assume that the wireless device can perform N blind decoding attempts in one subframe. If K blind decoding attempts are performed at a subframe k in the PDCCH region, up to (N−K) blind decoding attempts can be performed in the EPDCCH region. In a subframe k+1, if the PDCCH region is not monitored, up to N blind decoding trials can be performed in the EPDCCH region.

In order to minimize a blocking probability of DCI transmission, it is proposed to regulate the number of aggregation levels/EPDCCH candidates of the EPDCCH region monitored by the wireless device according to a subframe, in particular, according to whether the PDCCH is decoded in a corresponding subframe.

Figure 7:
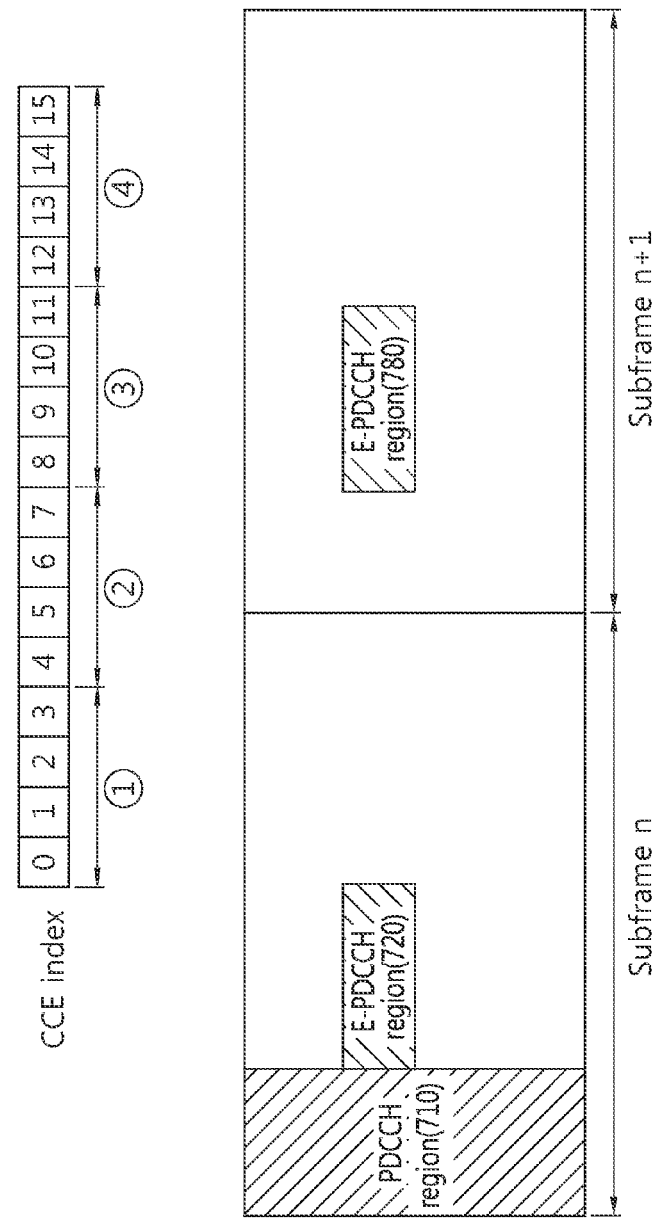
FIG. 7 shows monitoring of a control channel according to an embodiment of the present invention.

FIG. 7 shows monitoring of a control channel according to an embodiment of the present invention.

There are 16 CCEs indexed from 0 to 15. It is assumed that an aggregation level is L=4, and there are four PDCCH candidates ①②③④. Therefore, at the aggregation level L=4, the maximum number of blind decoding trials is 4.

It is assumed that the wireless device monitors a PDCCH region 710 and an EPDCCH region 720 in a subframe n, and monitors an EPDCCH region 780 in a subframe n+1.

In the subframe n, the wireless device monitors the PDCCH candidate ① in the PDCCH region 710, and monitors the PDCCH candidates ②③④ in the EPDCCH region 720. In the subframe n+1, the wireless device monitors the PDCCH candidates ①②③④ in the EPDCH region 780. Therefore, the maximum number of blind decoding trials may be equally set to 4 in all subframes.

The locations/number of PDCCH/EPDCCH regions, an aggregation level, the number of PDCCH candidates, and the number of CCEs are for exemplary purposes only.

Although it is exemplified in the figure that the PDCCH and the EPDCCH use the same CCE aggregation, resources may be independently allocated to the PDCCH and the EPDCCH. The PDCCH may use the existing CCE aggregation, and the EPDCCH may use an ECCE aggregation.

By assuming that there are N PDCCH/EPDCCH candidates, the PDCCH may perform decoding on first (N−K) PDCCH candidates. In order to have positions of the PDCCH candidates in a uniform manner in the CCE aggregation, a CCE index obtained through a computation of floor{n*N/(N−K)} (n=0, 1, . . . , N−K−1) may be selected as a start point of the PDCCH candidate. Herein, floor{x} implies the greatest integer number less than x.

The following equation indicates an exemplary equation for partitioning of the PDCCH and the EPDCCH.

$$f(i) = c \cdot \text{floor}\left(\frac{iN+a}{K}\right) + b \qquad \text{[Equation 5]}$$

Herein, N denotes the total number of PDCCH candidates in a search space to be partitioned, K denotes the number of PDCCH candidates to be allocated to the PDCCH or the E-PDCCH, and 'i' denotes an index of a PDCCH candidate to be selected. 'a', 'b', 'c' are parameters based on a partitioning ratio and a selection pattern.

In another method, a BS may configure positions and the number of (N−K) PDCCH candidates to a UE by using a higher layer signal.

Now, a method of defining a CSS in an EPDCCH region is proposed.

Hereinafter, a USS and a CSS denote a USS and a CSS in a PDCCH region, and an enhanced-USS (E-USS) and an enhanced-CSS (E-CSS) denote a USS and a CSS in an EPDCCH region. The CSS is a region monitored by a plurality of wireless devices in a cell or all wireless devices in the cell.

A CSS in the existing PDCCH region has an aggregation level of {4, 8}, and its starting point is fixed. In the EPDCCH region, the E-CSS and the E-USS are allowed to partially or entirely overlap. Herein, the overlapping region may be configured depending on a position of an E-PDCCH candidate of the E-CSS.

Since the E-CSS is aiming at the delivery of system information and control information for a plurality of wireless devices, high reliability is required. Therefore, for example, a relatively higher aggregation level such as {4, 8} is preferably used. If the E-USS is defined for an aggregation level L={1, 2, 4, 8}, the wireless device must know a fact that an E-CSS DCI format may be detected at L={4, 8}. In this case, if the E-CSS is configured with the same size as the DCI format 1A/0, a similar method of distinguishing the DCI format 1A/0 can be applied to the E-CSS DCI format, thereby being able to decrease blind decoding complexity. To distinguish the E-CSS, an additional RNTI may be used or DCI may be allowed to include an indicator for distinguishing the CSS/USS.

As to a specific aggregation level (e.g., 4, 8), only the E-CSS DCI format may be allowed to be monitored. In addition, similarly to L=12, the E-CSS may use an aggregation level different from that of the E-USS. The overlapping of the E-USS and the E-CSS may be applied for some aggregation levels or all aggregation levels. Alternatively, it may be assumed that some of aggregation levels that can be used by the E-USS are assigned to the E-CSS, and the E-USS does not use the aggregation levels. For example, although L={1, 2, 4, 8} is defined in the E-USS, if the E-CSS is set to L=4, the wireless device may attempt an EPDCCH detection only for L={1, 2, 8} in the E-USS.

The E-CSS in the EPDCCH region may be monitored by a specific wireless group or a wireless device sharing a DM RS.

Now, a subframe configuration for a PDCCH and an EPDCCH will be described.

The following table shows an example of the subframe configuration.

TABLE 5

| Subframe configuration | CSS (PDCCH) | USS (PDCCH) | E-CSS | E-USS | Exemplary usage |
|---|---|---|---|---|---|
| 1 | O | | | | CSS fallback |
| 2 | | O | | | USS fallback |
| 3 | | | O | | E-CSS only |
| 4 | | | | O | E-USS only |
| 5 | O | O | | | PDCCH only |
| 6 | O | | O | | CSS/E-CSS partitioning |
| 7 | O | | | O | CSS/USS partitioning |
| 8 | | O | O | | |
| 9 | | O | | O | |
| 10 | | | O | O | EPDCCH only |
| 11 | O | O | O | | |
| 12 | O | O | | O | CSS fallback |
| 13 | O | | O | O | |
| 14 | | O | O | O | |
| 15 | O | O | O | O | |
| 16 | | | | | N/A |

In the above table, 'O' indicates that a corresponding search space exists in a corresponding subframe.

The subframe configuration 7 indicates a search space partitioning in a normal subframe. The CSS is defined in a reliable PDCCH region, and the E-USS is defined in the EPDCCH region. The EPDCCH transmits scheduling information of the wireless device, and the PDCCH transmits common control information.

The subframe configuration 13 shows that the E-CSS and the E-USS are defined in the EPDCCH region, but the CSS is additionally defined in the PDCCH region. Since blind decoding complexity is significantly dependent on the number of blind decoding trials, when three search spaces are properly designed within a range in which the maximum number of trails is not increased, the complexity may not be decreased. More specifically, the number of EPDCCH candidates or an aggregation level may be distributed between the CSS and the E-CSS. For example, the CSS may use an aggregation level 4, and the E-CSS may use an aggregation level 8. The number of blind decoding trials may be set identically or differently between the CSS and the E-CSS. The blind decoding distribution based on the search space may also apply to the subframe configurations 6, 7, 9, 12, 13, 14, and 15.

In the subframe configuration 15, the CSS/USS is defined both in the PDCCH region and the E-PDCCH region.

In the subframe configuration 5, only the CSS/USS of the PDCCH region is defined. This may be regarded as a kind of PDCCH fallback. While monitoring the EPDCCH region, the wireless device may transition to a fallback mode, i.e., a mode of monitoring the PDCCH, in a specific situation. In the fallback mode, a greater number of aggregation levels or a greater number of PDCCH candidates may be defined, unlike 3GPP LTE.

The subframe configuration 11 may be utilized to ensure an additional E-CSS due to a shortage of the CSS in the PDCCH region.

The subframe configuration 12 is based on monitoring of a reliably designed PDCCH region, and is a method of additionally ensuring an E-USS in the E-PDCCH region.

The subframe configuration 13 is for additionally ensuring an E-CSS in the subframe configuration 7. It may also be interpreted in an opposite way, such that the E-PDCCH is configured and a CSS is additionally ensured in the PDCCH region.

The subframe configuration 14 is for additionally monitoring a USS in the PDCCH region in an EPDCCH monitoring mode.

The aforementioned subframe configurations 1 to 16 may be combined. The subframe configuration may be changed periodically or aperiodically in unit of a subframe. Since each subframe configuration has its own advantage, it may be effective to select a proper subframe configuration according to a situation.

For example, the subframe configurations 10 and 5 may be combined. Only the EPDCCH may be monitored by the subframe configuration 10 in a specific subframe, and only the PDCCH may be monitored by the subframe configuration 5 in other subframes.

The subframe configurations 7 and 5 may be combined. A CSS of the PDDCH region and a USS of the EPDCCH region may be monitored by the subframe configuration 7 in a specific subframe, and only the PDCCH may be monitored by the subframe configuration 5 in other subframes. This may be effectively applied to a special subframe of TDD. The special subframe may be dependent on the PDCCH according to the subframe configuration 5, and other TDD subframes may be dependent on the subframe configuration 7.

The subframe configurations 9 and 6 may be combined. A USS of the PDCCH region and an E-USS of the EPDCCH region may be monitored by the subframe configuration 9 in a specific subframe, and a CSS of the PDCCH region and an E-CSS of the EPDCCH may be monitored by the subframe configuration 6 in other subframes.

The aforementioned combinations are for exemplary purposes only, and thus various combinations of the subframe configurations 1 to 16 are also possible. Alternatively, one or more subframe configurations may be applied to one subframe. The subframe configuration may change when a specific condition is satisfied or may change according to a predetermined pattern.

The subframe configuration may be configured in unit of a subframe or in unit of a radio frame. ABS may configure a period and/or condition of changing the subframe configuration to a wireless device.

The BS may allocate an available subframe configuration group to the wireless device, and may activate/deactivate the available subframe configuration group. For example, the BS may report to the wireless device that the available subframe configurations are subframe configurations 7 and 5. In addition, the BS may report the subframe configuration in unit of a subframe or in unit of a radio frame. For example, if the BS transmits a bitmap {0001100000} to the wireless device with respect to 10 subframes belonging to the radio frame, the wireless device may apply the subframe configuration 5 to subframes having indices 3 and 4, and may apply the subframe configuration 7 to the remaining subframes. Thereafter, to change the subframe configuration, the BS may transmit only the changed bitmap to the wireless device.

The subframe configuration may vary depending on a bandwidth. For example, assume that a wireless network supports a 20 MHz bandwidth and a 1 MHz bandwidth. In this case, the number of REs allocated to a data region may be insufficient in a subframe corresponding to the 1 MHz bandwidth. Therefore, the subframe configuration 7 may be used in the 20 MHz bandwidth, and the subframe configuration 5 may be used in the 1 MHz configuration.

Figure 8:
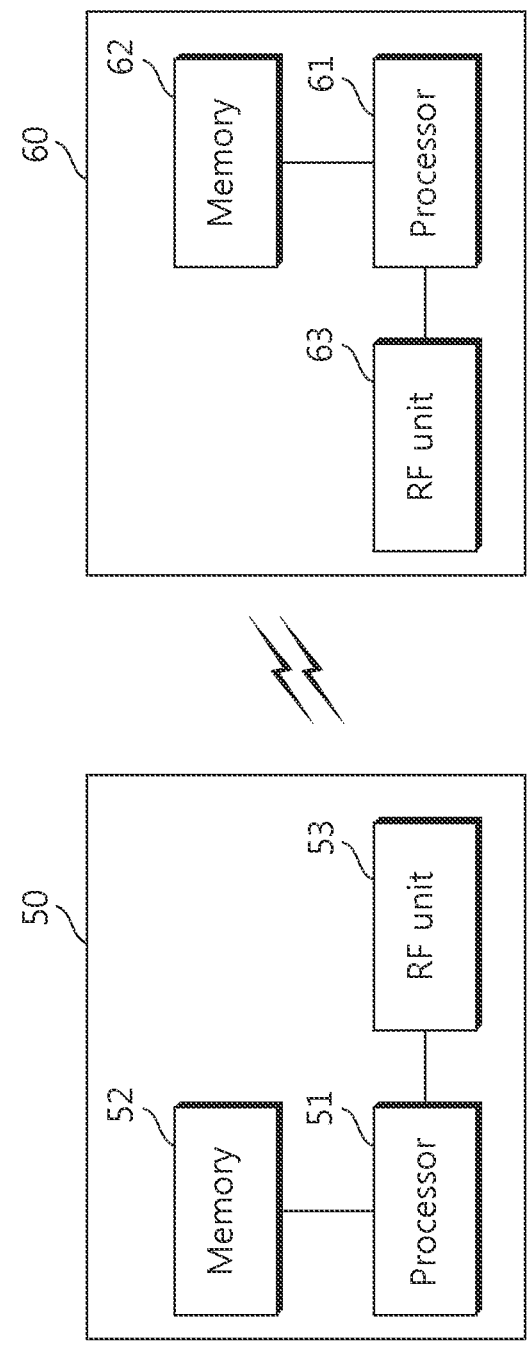
FIG. 8 is a block diagram showing a wireless communication system according to an embodiment of the present invention.

FIG. 8 is a block diagram showing a wireless communication system according to an embodiment of the present invention.

ABS 50 includes a processor 51, a memory 52, and a radio frequency (RF) unit 53. The memory 52 is coupled to the processor 51, and stores a variety of information for driving the processor 51. The RF unit 53 is coupled to the processor 51, and transmits and/or receives a radio signal. The processor 51 implements the proposed functions, procedures, and/or methods. Layers of a radio interface protocol can be implemented by the processor 51. The processor 51 can configure a search space for an EPDCCH and/or a PDCCH, and can transmit the EPDCCH and the PDCCH.

A wireless device 60 includes a processor 61, a memory 62, and an RF unit 63. The memory 62 is coupled to the processor 61, and stores a variety of information for driving the processor 61. The RF unit 63 is coupled to the processor 61, and transmits and/or receives a radio signal. The processor 61 implements the proposed functions, procedures, and/or methods. Layers of a radio interface protocol can be implemented by the processor 61. The processor 61 can monitor an EPDCCH and a PDCCH in a search space.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method of monitoring a control channel in a wireless communication system, the method comprising:

receiving, by a wireless device, from a base station, a radio resource control (RRC) signal, the RRC signal including first information on at least one subframe on which at least one enhanced physical downlink control channel (EPDCCH) is monitored and second information on a user equipment (UE)-specific search space;

monitoring, by a wireless device, a physical downlink control channel (PDCCH) in a common search space of a subframe; and monitoring, by the wireless device, the EPDCCH in the UE-specific search space on the subframe indicated by the first information, wherein the EPDCCH is demodulated by a demodulation reference signal (DMRS).

2. The method of claim 1, wherein:

the EPDCCH in the UE-specific search space is decoded by the DMRS which is generated based on the identifier specific to the wireless device, and the PDCCH in the common search space is decoded by a cell-specific reference signal (CRS) which is generated based on an identifier shared by one or more wireless devices.

3. The method of claim 1, wherein the subframe includes a plurality of orthogonal frequency division multiplexing (OFDM) symbols.

4. The method of claim 3, wherein the common search space is started from a first OFDM symbol of the plurality of OFDM symbols, and the UE-specific search space is started from an OFDM symbol indicated by the serving cell.

5. A wireless device for monitoring a control channel in a wireless communication system, the wireless device comprising:

a radio frequency (RF) unit configured to transmit and receive a radio signal; and a processor operatively coupled to the RF unit and configured to:

receive, by a wireless device, from a base station, a radio resource control (RRC) signal, the RRC signal including first information on at least one subframe on which at least one enhanced physical downlink control channel (EPDCCH) is monitored and second information on a user equipment (UE)-specific search space, monitor a physical downlink control channel (PDCCH) in a common search space of a subframe, and monitor the EPDCCH in the UE-specific search space on the subframe indicated by the first information, wherein the EPDCCH is demodulated by a demodulation reference signal (DMRS).

6. The wireless device of claim 5, wherein:

the EPDCCH in the UE-specific search space is decoded by the DMRS which is generated based on the identifier specific to the wireless device, and the PDCCH in the common search space is decoded by a cell-specific reference signal (CRS) which is generated based on an identifier shared by one or more wireless devices.

7. The wireless device of claim 5, wherein the subframe includes a plurality of orthogonal frequency division multiplexing (OFDM) symbols.

8. The wireless device of claim 7, wherein the common search space is started from a first OFDM symbol of the plurality of OFDM symbols, and the UE-specific search space is started from an OFDM symbol indicated by the serving cell.

* * * * *